(12) United States Patent
Amano et al.

(10) Patent No.: US 10,254,051 B2
(45) Date of Patent: Apr. 9, 2019

(54) CONTROL SYSTEM FOR CHEMICAL HEAT ACCUMULATOR

(71) Applicant: TOYOTA JIDOSHA KABUSHIKI KAISHA, Toyota-shi, Aichi-ken (JP)

(72) Inventors: Takashi Amano, Susono (JP); Hidefumi Aikawa, Shizuoka-ken (JP); Yoshio Hasegawa, Susono (JP); Jumpei Kashiwakura, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/434,719

(22) Filed: Feb. 16, 2017

(65) Prior Publication Data
US 2017/0241719 A1  Aug. 24, 2017

(30) Foreign Application Priority Data

Feb. 18, 2016 (JP) ................................ 2016-029155

(51) Int. Cl.
*F28F 27/00* (2006.01)
*F28D 20/00* (2006.01)
*F28D 1/02* (2006.01)

(52) U.S. Cl.
CPC ......... *F28D 20/003* (2013.01); *F28D 1/0226* (2013.01); *F28F 27/00* (2013.01)

(58) Field of Classification Search
CPC ........................... F28D 20/0003; F28D 20/028
(Continued)

(56) References Cited

U.S. PATENT DOCUMENTS 4,319,626 A * 3/1982 Papazian et al. ....... F25B 30/04
                                                   122/21
4,523,635 A * 6/1985 Nishizaki et al. ...... F25B 17/12
                                                  165/104.12
(Continued)

FOREIGN PATENT DOCUMENTS

EP         0443620 A2    2/1991
JP       H03-247968 A   11/1991
(Continued)

*Primary Examiner* — Allen J Flanigan
(74) *Attorney, Agent, or Firm* — Hunton Andrews Kurth LLP

(57) ABSTRACT

There is provided a control system of a chemical heat accumulator which enables to facilitate small-sizing of the chemical heat accumulator by carrying out heat release and heat accumulation according to a degree of priority by appropriately selecting a location of carrying out the heat release and heat accumulation on priority basis. A chemical heat accumulator includes a valve mechanism which makes a plurality of reactors communicate separately with a reservoir, and cuts off the plurality of reactors from the reservoir. When both reactors are in a state in which an exothermic reaction between a reaction material and a reaction medium is possible, or in a state in which an endothermic reaction in which the reaction medium is desorbed is possible, a controller which controls an opening of a valve mechanism controls the opening of the valve mechanism such that a flow rate of the reaction medium circulated between the first reactor and the reservoir for which a degree of priority of heat release or heat accumulation is high becomes higher than a flow rate of the reaction medium circulated between the second reactor and the reservoir for which the degree of priority of heat release or heat accumulation is low.

9 Claims, 13 Drawing Sheets

(58) Field of Classification Search
USPC .......................................... 165/236, 104.12
See application file for complete search history.

(56) References Cited

U.S. PATENT DOCUMENTS

| | | | | |
|---|---|---|---|---|
| 4,976,117 | A | * 12/1990 | Crozat | ................. C09K 5/16 |
| | | | | 165/104.12 |
| 5,409,676 | A | * 4/1995 | Nasako et al. | ........ F28D 20/003 |
| | | | | 165/101 |
| 5,477,705 | A | * 12/1995 | Meunier | ................. F25B 17/08 |
| | | | | 165/104.12 |
| 8,951,475 | B2 | * 2/2015 | Komaki et al. | ....... F28D 20/003 |
| | | | | 165/104.12 |
| 2009/0031978 | A1 | 2/2009 | Kobayashi et al. | |
| 2010/0162972 | A1 | 7/2010 | Hayashi et al. | |

FOREIGN PATENT DOCUMENTS

| | | |
|---|---|---|
| JP | 2007-211699 A | 8/2007 |
| JP | 2007-212014 A | 8/2007 |
| JP | 2007-285189 A | 11/2007 |
| JP | 2007-321638 A | 12/2007 |
| JP | 2007-321729 A | 12/2007 |
| JP | 2014-214650 A | 11/2014 |
| JP | 2014-227861 A | 12/2014 |
| JP | 2015-081519 A | 4/2015 |

* cited by examiner

CONTROL SYSTEM FOR CHEMICAL HEAT ACCUMULATOR

CROSS REFERENCE TO RELATED APPLICATIONS

The present application claims the benefit of Japanese Patent Application No. 2016-029155 filed on Feb. 18, 2016 with the Japanese Patent Office, the disclosures of which are incorporated herein by reference in its entirety.

BACKGROUND

Field of the Disclosure

Embodiments of the present invention relate to a control system for a chemical heat accumulator that releases and accumulates heat utilizing a reversible chemical reaction between a reaction material and a reaction medium.

Discussion of the Related Art

Systems of this type have been described in Japanese Patent Application Laid-open Publication No. 2014-227861. In the system described in Japanese Patent Application Laid-open Publication No. 2014-227861, a first reactor containing a first reaction material is fitted to an object to be heated, and by supplying a first reaction medium from a first reservoir to the first reactor, heat is generated by a reaction between the first reaction material and the first reaction medium in the first reactor, and the object to be heated is heated by the heat generated. As a temperature of the object to be heated becomes high by heat of an exhaust gas, the first reaction medium is separated from the first reaction material, and the first reaction medium is adsorbed in the first reservoir. In other words, the heat is accumulated.

The system described in Japanese Patent Application Laid-open Publication No. 2014-227861 further has a second reactor at an outer side of the first reactor, and heat is generated by a reaction between a second reaction material contained in the second reactor and a second reaction medium supplied from a second reservoir, and the first reactor is heated by the heat generated. In other words, in the system described in Japanese Patent Application Laid-open Publication No. 2014-227861, when the first reactor has not been heated sufficiently by the exhaust gas, the first reaction medium is separated from the first reaction material by the heat from the second reactor, and the heat is accumulated sufficiently by the first reactor and the first reservoir.

In the system described in Japanese Patent Application Laid-open Publication No. 2014-227861, when the first reaction medium has not been separated adequately in the first reactor, the first reactor is heated by the heat generated in the second reactor. Consequently, since it is necessary to let an amount of heat generated in the first reactor and an amount of heat generated in the second reactor differ, the first reaction material and the second reaction material are to be different substances, and similarly the first reaction medium and the second reaction medium are to be different substances. In other words, in the system in the Japanese Patent Application Laid-open Publication No. 2014-227861, two locations having different heating temperature conditions are heated, and two reactors and two reservoirs have been provided for accumulating heat.

The system provided with the plurality of reactors and reservoirs can be possibly used for heating and accumulating heat in members or locations with the same or close temperature conditions for heating and accumulating heat. In that case, a reactor is to be provided at each location, and if the temperature conditions for heating and accumulating heat are same, the reaction medium and reservoir can be used in common with the plurality of reactors. However, even when the temperature conditions for heating and accumulating heat are same or close, the degree of priority of heat release and heat accumulation of the reactor provided at each location is different, and moreover, if the degree of priority of the heat release and heat accumulation of the reactor and the temperature conditions do not match, the reaction medium is stored in a reactor having a low degree of priority rather than being stored in a reactor having a high degree of priority for heat release and heat accumulation, or the reaction medium is desorbed from the reactor having a low degree of priority, thereby leading to a possibility of the heat release and heat accumulation according to the degree of priority not being carried out.

SUMMARY

Aspects of the present disclosure have been conceived noting the foregoing technical problems, and it is therefore an object of the present application is to provide a control system for a chemical heat accumulator which enables to facilitate small-sizing of the chemical heat accumulator by using a reaction medium in common for heating and accumulating heat at a plurality of locations, and which enables to carry out heat release and heat accumulation according to the degree of priority by appropriately selecting a location of carrying out the heat release or heat accumulation on priority basis.

To achieve the object, the present disclosure is characterized by a control system for a chemical heat accumulator, which releases heat by an exothermic reaction between a reaction material and a reaction medium, and accumulates heat by the reaction medium being desorbed from the reaction material and by maintaining the state of the reaction medium desorbed from the reaction material, wherein, the chemical heat accumulator includes a plurality of reactors, each containing the reaction material, which carry out heat exchange with an object to be heated, a reservoir which is connected to the plurality of reactors and stores the reaction medium, and a valve mechanism which makes the plurality of reactors communicate separately with the reservoir, and cuts off the plurality of reactors from the reservoir, including a controller which controls an opening of the valve mechanism, wherein when at least two of the plurality of reactors are in a state in which the exothermic reaction between the reaction material and the reaction medium is possible, or when at least two of the plurality of reactors are in a state in which an endothermic reaction in which the reaction medium is desorbed from the reaction material is possible, the controller controls the opening of the valve mechanism such that a flow rate of the reaction medium circulated between the reservoir and a first reactor having a high degree of priority of heat release or heat accumulation out of the two reactors, becomes higher than a flow rate of the reaction medium circulated between the reservoir and a second reactor with a low degree of priority of heat release or heat accumulation out of the two reactors.

In a non-limiting embodiment, the chemical heat accumulator may have a first pipe conduit which connects the first reactor and the reservoir and a second pipe conduit which connects the second reactor and the reservoir, and the valve mechanism may be capable of opening and closing the first pipe conduit and the second pipe conduit separately, and when at least two of the plurality of reactors are in a state in which the exothermic reaction between the reaction material and the reaction medium is possible, the controller may control the valve mechanism such that the first pipe conduit is open and the second pipe conduit is closed.

Moreover, in a non-limiting embodiment, after an amount of the reaction medium supplied to the first reactor reaches a predetermined amount, the controller may control the valve mechanism such that the second pipe conduit is closed.

Furthermore, in a non-limiting embodiment, the state of at least two reactors in which the endothermic reaction in which the reaction medium is desorbed from the reaction material is possible may include a state in which, a temperature of both reactors has reached a judgment reference temperature at which the reaction medium is desorbed from the reaction material, and when at least two reactors are in the state in which the endothermic reaction in which the reaction medium is desorbed from the reaction material is possible due to the temperature of the second reactor reaching the judgment reference temperature after the temperature of the first reactor has reached the judgment reference temperature, or when at least two reactors are in the state in which the endothermic reaction in which the reaction medium is desorbed from the reaction material is possible due to the temperature of the first reactor reaching the judgment reference temperature after the temperature of the second reactor has reached the judgment reference temperature, the controller may control the opening of the valve mechanism such that the flow rate of the reaction medium between the first reactor and the reservoir becomes higher than the flow rate of the reaction medium between the second reactor and the reservoir.

Moreover, in a non-limiting embodiment, the controller, after the completion of desorption of the reaction medium from the reaction material in the first reactor, may control the opening of the valve mechanism such that the flow rate of the reaction medium between the second reactor and the reservoir becomes higher than the flow rate of the reaction medium between the first reactor and the reservoir.

According to the non-limiting embodiments, since one reservoir is to be provided for the plurality of reactors, it is possible to simplify an overall arrangement of the chemical heat accumulator, and also to make the chemical heat accumulator small-sized. Furthermore, since the valve mechanism enables to prevent or suppress an effect of the endothermic reaction or the exothermic reaction in the other reactor with respect to the reactor in which the heat release or the heat accumulation is to be carried out on priority basis, it is possible to carry out the heat release and the heat accumulation effectively.

By supplying the reaction medium to each reactor, and opening and closing the pipe conduit that discharges, it is possible to avoid or suppress a situation in which the reaction medium supposed to be circulating between the reservoir and one of the reactors flows to another reactor. As a result, it is possible prioritize the heat release in a predetermined reactor.

In that case, since an amount of the reaction medium supplied to the second reactor increases after the reaction medium has been adequately supplied to the first reactor, it is possible to carry out heat release or warming-up accompanying the heat release in each reactor.

Furthermore, in the non-limiting embodiments, when there is a difference in a timing at which the temperature of the first reactor reaches a temperature at which the reaction medium can be desorbed and a timing at which the temperature of the second reactor reaches a temperature at which the reaction medium can be desorbed, since the opening of the mechanism is controlled such that the amount of the reaction medium circulating to the reservoir from the first reactor in which the heat accumulation is to be prioritized becomes larger than the amount of the reaction medium circulating to the reservoir from the second reactor, even if there is a desorption of the reaction medium in the second reactor, it is possible to lessen an effect thereof, and to make the desorption or in other words the heat accumulation occur in the first reactor, thereby enabling to carry out effectively the heat accumulation according to the degree of priority.

When there is such difference in the timings of reaching the temperature at which the desorption starts, the control in which the desorption in the first reactor is prioritized is continued till the desorption of the reaction medium in the first reactor is completed, and since the amount circulated of the reaction medium from the second reactor to the reservoir increases, it is possible to carry out effectively the heat accumulation according to the degree of priority.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENTS

Figure 1:
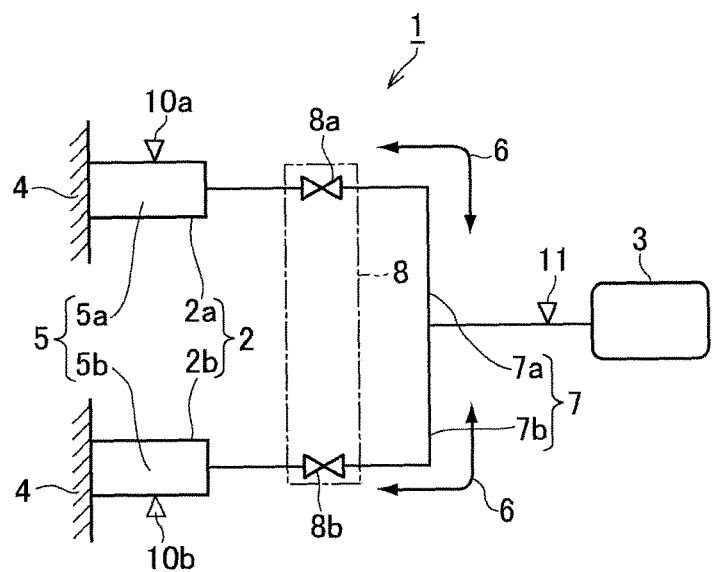
FIG. 1 is a block diagram showing schematically an example of a chemical heat accumulator of the present application.

An embodiment of a chemical heat accumulator according to the present application is shown schematically in FIG. 1. The chemical heat accumulator 1 shown here has a plurality of reactors 2 and an adsorber 3 used in common with the reactors 2. Two reactors 2a and 2b are shown in FIG. 1. The reactors 2a and 2b are fitted to a heating portion 4 to exchange heat with the heating portion 4.

The reactors 2a and 2b contain reaction materials (also referred to as the "heat storage materials") 5a and 5b to carry out an exothermic reaction and an endothermic reaction reversibly. The exothermic reaction occurs by chemically combining the reaction materials 5a and 5b with a reaction medium 6, and the endothermic reaction occurs by the reaction medium 6 being separated (desorbed) from the reaction materials 5a and 5b. The reaction materials 5a and 5b to carry out such chemical reactions may be substances such as Mg, CaO, and $FeCl_2$ used in the conventional chemical heat accumulator, and moreover, substances described in Japanese Patent Application Laid-open Publication No. 2014-227861 may also be used as the reaction materials 5a and 5b. Therefore, for the reaction medium 6, depending on the substances to be used as the reaction materials 5a and 5b, substances such as $NH_3$, $H_2O$, and $CO_2$ which cause the exothermic reaction and the endothermic reaction to occur are to be used.

The adsorber 3 is a reservoir which stores the reaction medium 6 in a state of being separated from the reaction materials 5a and 5b, and may contain a porous body made of ceramic or synthetic resin, a compact of activated charcoal, or water which makes a reaction medium condensate, as an adsorbent, depending on the reaction medium 6.

The heating portions 4 to which the reactors 2a and 2b are to be fitted are locations of which the temperature becomes high when stopped and low by being operated, and a cylinder block of an engine, vicinity of an intake port, vicinity of an exhaust port, an oil pan, and an exhaust purification catalyst may be cited as examples thereof.

The reactors 2a and 2b, and the adsorber 3 are made to communicate by a pipe conduit 7 through which the reaction medium is circulated. A valve mechanism 8 is provided at some mid-point of the pipe conduit 7. The valve mechanism 8 controls separately the circulation of the reaction medium 6 between one reactor 2a and the adsorber 3 and the circulation of the reaction medium 6 between the other reactor 2b and the adsorber 3. The valve mechanism 8 includes a valve 8a provided to a pipe conduit 7a which makes the one reactor 2a communicate with the adsorber 3, and a valve 8b provided to a pipe conduit 7b which makes the other reactor 2b communicate with the adsorber 3. The valves 8a and 8b may be flow control valves that are controlled electrically or may be pressure control valves. When two reactors 2a and 2b are provided for one adsorber 3, the valve mechanism 8 may include a three-way switching valve.

Figure 2:
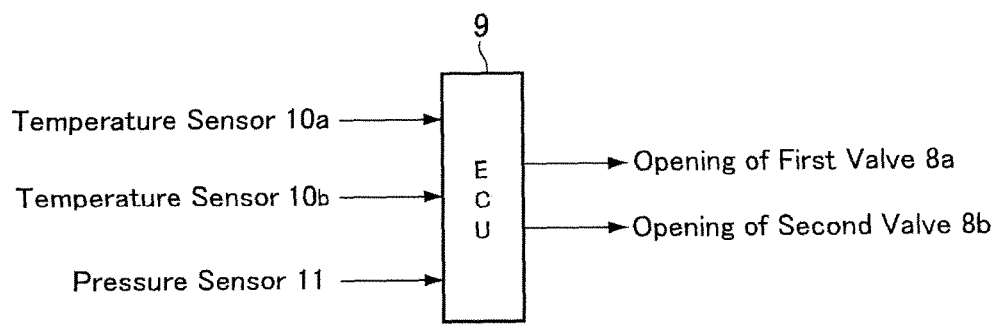
FIG. 2 is a block diagram showing an example of input data and an output signal for an electronic control unit (ECU)

Although it is not shown in FIG. 1, an electronic control unit (ECU) 9 for switching and controlling an opening of the valve mechanism 8 is provided. Temperature sensors 10a and 10b which detect the temperature of the reactors 2a and 2b respectively, and a pressure sensor 11 which detects the pressure of the reaction medium 6 in the adsorber 3 are provided for acquiring data for the control of the valve mechanism 8. The ECU 9 corresponds to a controller in the embodiment of the present disclosure, and includes a microcomputer as a main component. The microcomputer performs computing by using data input from the temperature sensors 10a and 10b, the pressure sensor 11 and from other sensors not shown in the diagram, and data that has been stored in advance, and outputs results of computation to the valves 8a and 8b as control command signals, thereby switching and controlling the opening of the valves 8a and 8b. An example of input data for the ECU 9 and output signals from the ECU 9 is shown in FIG. 2.

Figure 3A:
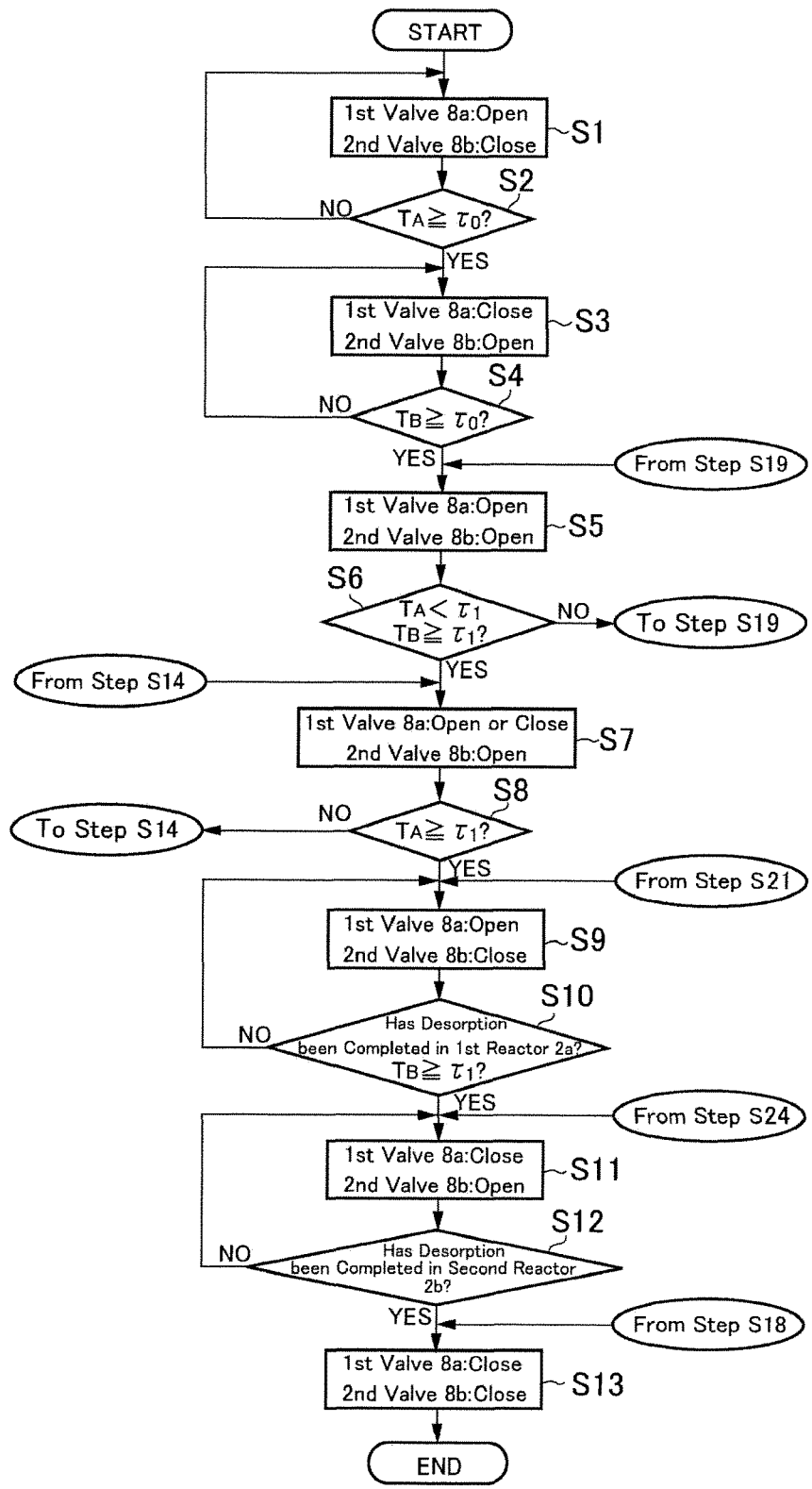
FIG. 3a is a partial flowchart showing a part of an example of control carried out by a control system in an embodiment of the present application.
Figure 3B:
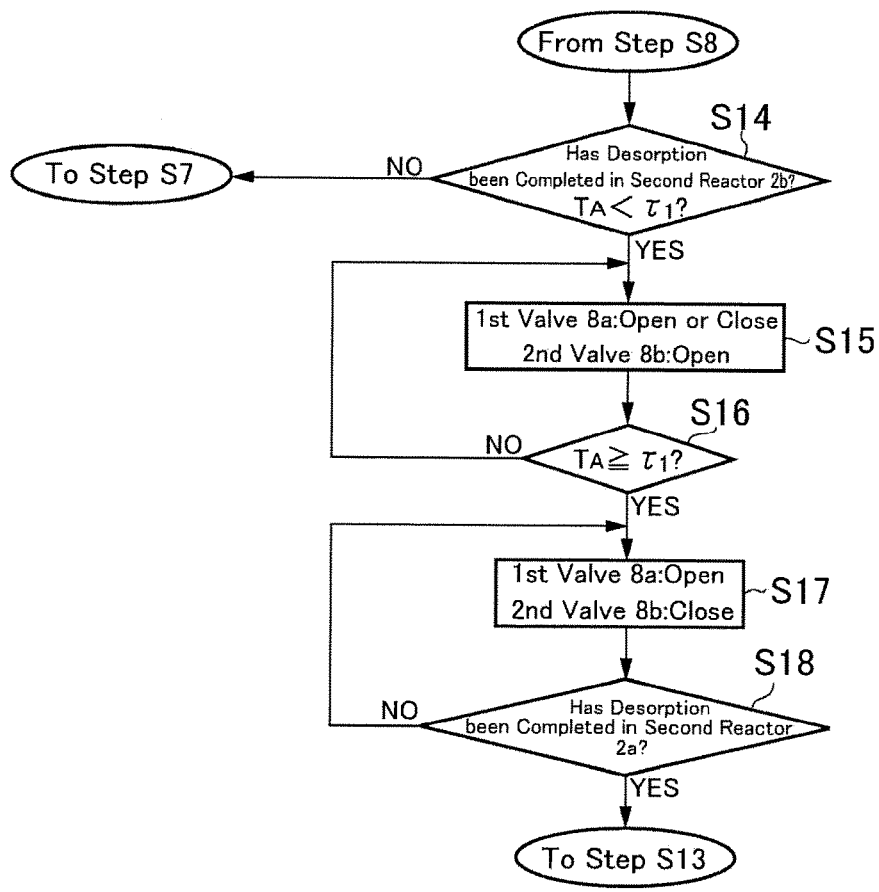
FIG. 3b is a partial flowchart showing another part of the example of control carried out by the control system in the embodiment of the present application.
Figure 3C:
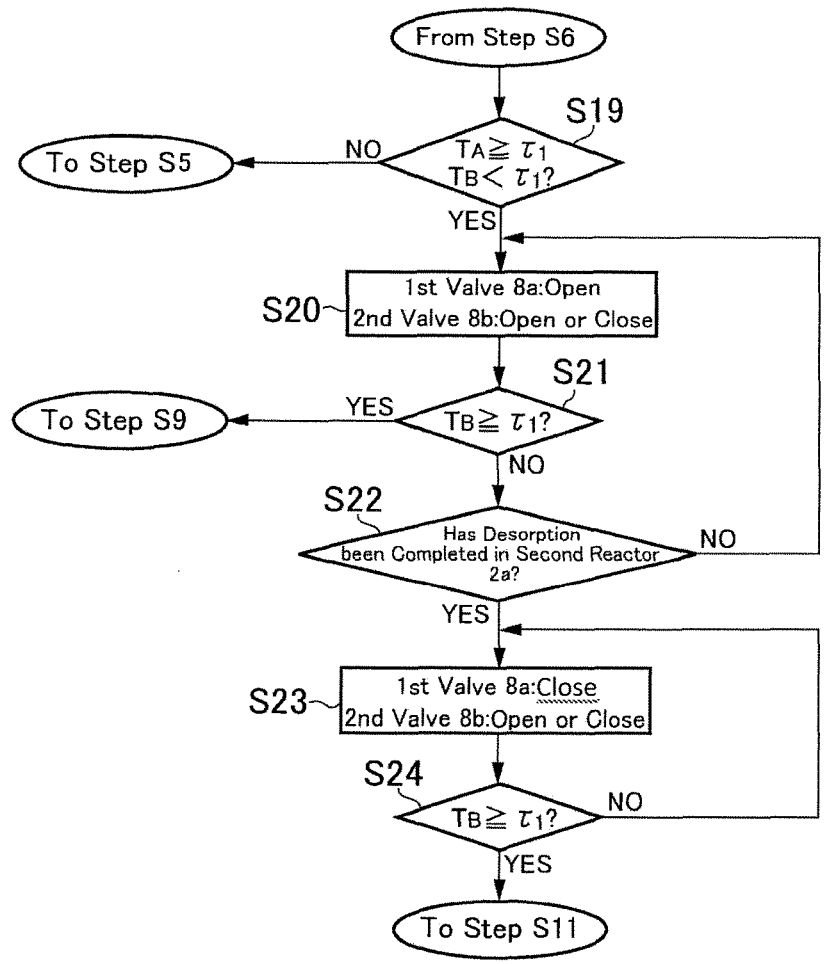
FIG. 3c is a partial flowchart showing still another part of the example of control carried out by the control system in the embodiment of the present application.

The control system as the embodiment of the present application makes occur on the priority basis the exothermic reaction and the endothermic reaction in the reactor 2a provided at a location to be heated on priority basis, of the reactors 2a and 2b communicating with the adsorber 3. More specifically, the control system controls the circulation or the pressure of the reaction medium 6 in the reactors 2a and 2b by the valve mechanism 8, and assigns a degree of priority to heat release of the reactors 2a and 2b, and also assigns a degree of priority to heat accumulation in preparation to the subsequent heat release. FIGS. 3a, 3b, and 3c are flow charts for explaining an example of the control carried out by the control system as the embodiment of the present application. A routine shown in FIGS. 3a, 3b, and 3c is carried out when an engine is to be started in a state of a low engine-water temperature.

In FIG. 3a, firstly, an amount of the reaction medium 6 supplied to the one reactor (hereinafter, referred to as the "first reactor") 2a having a high degree of priority for heat release and heat accumulation is made larger than an amount of the reaction medium 6 supplied to the other reactor (hereinafter, referred to as the "second reactor") 2b having a degree of priority for heat release and heat accumulation lower than that of the first reactor 2a (step S1). Here, "priority" means completing the heat release or heat accumulation early, and "the reactor having a high degree of priority" refers to the reactor for which the heat release or the heat accumulation is to be completed earlier than the other reactor. Moreover, the reactor for which the heat release is to be completed earlier than for the other reactor is a reactor fitted to an object to be heated for which an amount of heat release is smaller than for an object to be heated to which the other reactor is fitted, and which has been fitted to an object to be heated for which a warming-up time is longer than for the other object to be heated. Furthermore, the reactor for which the heat accumulation is to be completed earlier than for the other reactor is a reactor for which the amount of heat release is small, and which is fitted to the object to be heated for which the time taken for attaining the temperature at which the reaction medium is desorbed from a heat accumulation material is longer as compared to that for the reactor fitted to the other object to be heated, irrespective of a fact that the heating is more necessary than for the object to be heated which is fitted to the other reactor at the time of subsequent exothermic reaction.

The control at step S1 can be carried out by making the opening of the valve (hereinafter, also referred to as the "first valve") 8a on the first reactor 2a side larger than the opening of the valve (hereinafter, also referred to as the "second valve") 8b on the second reactor 2b side. In that case, the opening of the first valve 8a is to be larger than the opening of the second valve 8b, and therefore the second valve 8b may have been closed. For the valves 8a and 8b, when the opening is large, it will be referred to as "open" and when the opening is small (including when the valve is fully closed), it will be referred to as "closed".

In the reactors 2a and 2b, the exothermic reaction occurs depending on whether or not there is a supply of the reaction medium 6, and whether the amount of the reaction medium 6 supplied is large or small. In other words, because the amount of the reaction medium 6 supplied to the first reactor 2a is larger than the amount of the reaction medium 6 supplied to the second reactor 2b, or because the reaction medium 6 is not supplied to the second reactor 2b, the reaction between the reaction material 5a and the reaction medium 6 in the first reactor 2a occurs in the second reactor 2b on the priority basis, and the temperature thereof rises. In other words, a location of the heating portion 4 to which the first reactor 2a is fitted is heated (or warmed up) with priority over the other locations.

While the control at step S1 is being carried out, a judgment of whether or not a temperature $T_A$ of the first reactor 2a has reached a threshold value $\tau_0$ set in advance is made (step S2). The threshold value $\tau_0$ is a temperature for determining that an amount of the reaction medium 6 sufficient for generating an amount of heat demanded by the first reactor 2a has been supplied to the first reactor 2a, or that an amount of the reaction medium 6 set in advance has been supplied to the first reactor 2a, and can be set in advance by experiment etc. If the answer of step S2 is NO, the routine returns to step S1, and the previous control is continued.

Whereas, if the answer of step S2 is YES, the first valve 8a is closed (including reducing the opening), and the second valve 8b is opened (including increasing the opening) (step S3). In other words, the opening of the second valve 8b is made larger than the opening of the first valve 8a, thereby increasing the amount of the reaction medium 6 supplied to the second reactor 2b. Consequently, although the temperature of the first reactor 2a has become higher than the temperature of the second reactor 2b, a temperature rise gradient is lowered due to the amount of the reaction medium 6 supplied to the first reactor 2a being reduced.

Whereas, in the second reactor 2b, when the exothermic reaction becomes vigorous due to an increase in the amount of the reaction medium 6 supplied, the temperature rise gradient becomes large with the increase in the amount of heat release. In a state of the heating portion 4 heated (warmed-up) by allowing the exothermic reaction to occur in the reactors 2a and 2b, the engine having the heating portion 4 is started up. Since the heating portion 4 also releases heat with the start-up of the engine, the heat released by the heating portion 4 is also added and there is a rise in the temperature of the reactors 2a and 2b.

A judgment of whether or not a temperature $T_B$ of the reactor 2b rising up in such manner has reached the threshold value $\tau_0$ is made (step S4). If the answer of step S4 is NO, the routine returns to step S3, and the previous control is maintained. Whereas, if the answer of at step S4 is YES, the reaction medium 6 has been supplied adequately to the second reactor 2b as well, and the exothermic reaction is almost completed. Consequently, if the answer of step S4 is YES, the first valve 8a which was fully closed at step S3, or had the opening reduced is fully opened, or the opening thereof is increased, and the second valve 8b is maintained to be opened (step S5). Thus, in preparation for the desorption in the first reactor 2a and the second reactor 2b, both the first valve 8a and the second valve 8b are opened. The opening of the first valve 8a and the second valve 8b are not necessarily required to be the same, and may be different provided that the valves are opened.

Next, a judgment of whether or not the temperature $T_A$ of the first reactor 2a is less than a desorption start temperature $\tau_1$ and the temperature $T_B$ of the second reactor 2b has reached the desorption start temperature $\tau_1$ is made (step S6). The desorption start temperature $\tau1$ corresponds to the judgment reference temperature in the embodiment of the present application, and is determined according to the reaction materials 5a and 5b, and the reaction medium 6. For instance, when the reaction materials 5a and 5b are Mg, and the reaction medium is $H_2$, the desorption start temperature $\tau_1$ is 287° C., when the reaction materials 5a and 5b are Ca, and the reaction medium 6 is $H_2O$, the desorption start temperature $\tau_1$ is 480° C., and when the reaction materials 5a and 5b are $FeCl_2.NH_3$, and the reaction medium 6 is $NH_3$, the desorption start temperature $\tau_1$ is 278° C. As mentioned above, after the temperature $T_B$ of the second reactor 2b has reached the threshold value $\tau_1$ (step S4), since the first valve 8a is fully opened, or the opening thereof is increased, sometimes the temperature $T_A$ of the first reactor 2a reaches the desorption start temperature $\tau_1$ belatedly. In such case, the answer of step S6 will be YES. In that case, the second valve 8b is fully opened, or the opening thereof is increased, and with the second valve 8b in such state, the first valve 8a is controlled to be either opened or closed (step S7).

The reason for letting the first valve 8a to be either opened or closed is that the first reactor 2a is heated by the heating portion 4 which is already in an operational state, and the temperature of the first reactor 2a is being awaited to reach $\tau1$. Moreover, by the temperature of the second reactor 2b already having reached the desorption start temperature $\tau1$, and an endothermic reaction of the reaction medium 6 separating (desorbing) from the reaction material 5b having occurred, and a state of being capable of heat accumulation having assumed, and besides, the first reactor 2a still not being in a state of the reaction medium 6 separating, since there is no possibility that the reaction medium 6 separated in the second reactor affects the first reactor 2a, the second valve 8b is maintained to be fully opened or having the opening increased.

As mentioned above, the first reactor 2a is heated by the heat of the heating portion 4, and with the first reactor 2a in heated state, a judgement of whether or not the temperature $T_A$ of the first reactor 2a has reached the desorption start temperature $\tau_1$ is made (step S8). If the answer of step S8 is YES, the first valve 8a is controlled to be fully opened, or the opening thereof is increased, and the second valve 8b is controlled to be fully closed, or the opening thereof is controlled to be smaller (step S9). Since the temperature $T_A$ of the first reactor 2a has reached the desorption start temperature $\tau_1$, and the state of being capable of desorption of the reaction medium 6 or in other words, capable of carrying out heat accumulation is assumed, the first valve 8a is fully open or the opening thereof is increased to carry out desorption of the reaction medium 6 in the first reactor 2a or in other words, to carry out the heat accumulation. At the same time, the second valve 8b is controlled to be fully closed, or the opening thereof is reduced.

By letting the second valve 8b to be fully opened, or by reducing the opening thereof, the reaction medium 6 separated from the reaction material 5b in the second reactor 2b is prevented or suppressed from flowing toward the first reactor 2a, and an internal pressure of the adsorber 3 is prevented or suppressed from becoming high. In this state of the second valve 8b, since the first reactor 2a communicates with the adsorber 3, the separation (desorption) of the reaction medium 6 in the first reactor 2a is accelerated. In other words, the desorption of the reaction medium 6 in the second reactor 2b, or in other words, the heat accumulation in the second reactor 2b is suppressed or limited, and the heat accumulation by the first reactor 2a is carried out on priority basis.

Next, a judgment of whether or not the desorption of the reaction medium 6 in the first reactor 2a has been completed is made (step S10). In that case, at the same time, since it is checked if the temperature $T_B$ of the second reactor 2b has dropped, and not become less than the desorption start temperature $\tau_1$, a judgment of whether or not the temperature $T_B$ of the second reactor 2b is higher than or equal to the desorption start temperature $\tau_1$ is made. A judgment of completion of desorption of the reaction medium 6 (heat accumulation) can be made according to the procedure described below.

Figure 4:
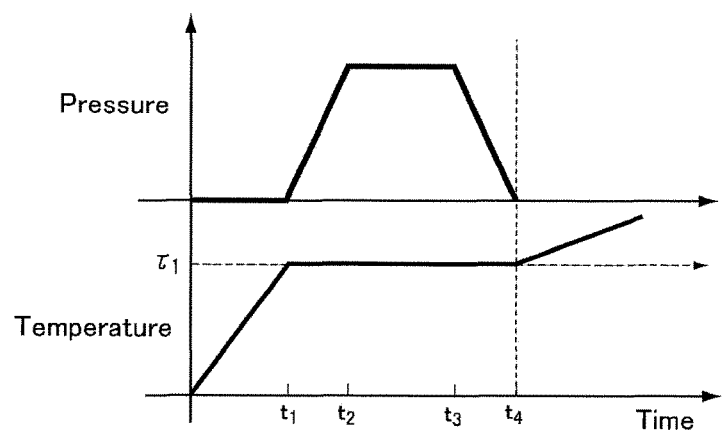
FIG. 4 is a line diagram depicting a relationship between a pressure and a temperature in a case of determining completion of desorption.

FIG. 4 shows schematically a change in the pressure and the temperature from the start of desorption of the reaction medium 6 in the reactor 2 till the completion of the desorption, and till the temperature of the reactor 2 (more precisely, the temperature of the reaction material) reaches the desorption start temperature $\tau_1$ (up to a point of time $t_1$), the pressure of the reactor 2 is almost constant provided that an expansion due to the rise in temperature is ignored. Thereafter, as the desorption of the reaction medium 6 starts, the pressure increases gradually. When the desorption of the reaction medium 6 and an adsorption of the desorbed reaction medium 6 by the adsorber 3 are balanced (point of time $t_2$), the pressure becomes almost constant (point of time $t_2$ to point of time $t_3$).

As the desorption progresses and the amount of the reaction medium 6 separated from the reaction material starts decreasing (point of time $t_3$), by an amount of the reaction medium 6 adsorbed by the adsorber 3 exceeding the amount separated from the reaction material, the pressure starts dropping. Since an endothermic reaction due to the desorption of the reaction medium has been occurring in the reactor 2, the temperature is maintained to be almost constant. Moreover, as the desorption of the reaction medium 6 is completed, since the endothermic reaction in the reactor 2 is over, the temperature of the reactor 2 starts rising due to the heat transmitted from the heating portion 4 (point of time $t_4$). Thus, as the desorption of the reaction medium 6 is completed, since the pressure drops as well as the temperature rises to be higher than or equal to the desorption start temperature $\tau_1$, by detecting such change in the temperature and pressure of the reactor 2, it is possible to make a judgment of the completion of the reaction medium 6.

When the completion of desorption of the reaction medium 6 in the first reactor 2a is judged in such manner at step S10 shown in FIG. 3a, and a negative judgment is made at step S10 due to the desorption not being completed, the routine returns to step S9 and the previous control state is maintained. Whereas, if the answer of step S10 is YES, the first valve 8a is fully closed, or the opening is reduced, and the second valve 8b is fully opened, or the opening is increased (step S11). By the second valve 8b being controlled in such manner, the desorption of the reaction medium in the second reactor 2b, or in other words, the heat accumulation is let to be progressed. In that case, by the first valve 8a being fully closed or by the opening being reduced, an inflow of the reaction medium 6 into the second reactor 2a in which the desorption of the reaction medium 6 has been completed, is prevented or suppressed, and the heat accumulation sate is maintained to be favorable.

A judgment of the completion of desorption of the reaction medium 6 from that second reactor 2b is made (step S12). If the answer of step S12 is NO, the process returns to step S11 for allowing the desorption of the reaction medium 6 in the second reactor 2b to continue, and the previous control state is maintained. Whereas, if the answer of step S12 is YES, both the valves 8a and 8b are closed (step S13), and thereafter, the routine shown in FIG. 3a is completed for a time. In other words, the reactors 2a and 2b are cut-off from the adsorber 3, thereby preventing the reaction material 5a and 5b from chemically combining with the reaction medium 6, and the heat accumulation state is maintained.

Figure 5:
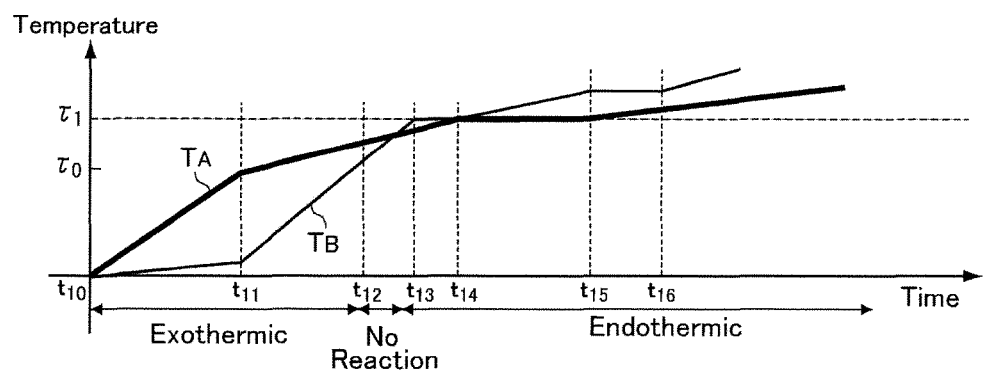
FIG. 5 is a time chart showing an example of a change in temperature of each reactor when the control is carried out by the control system in the embodiment of the present application.

A change in the temperatures $T_A$ and $T_B$ of the reactors 2a and 2b respectively when the control at steps S1 to step S13 in FIG. 3a described above has been carried out is as shown in a time chart in FIG. 5. The "open" state and the "closed" state of the valves 8a and 8b and the flow of the reaction medium 6 are shown schematically in FIGS. 6a, 6b, 6c, 6d, 6e, 6f and 6g. In FIGS. 6a, 6b, 6c, 6d, 6e, 6f and 6g, the valves 8a and 8b in white show the "open" state, the valves 8a and 8b in black show the "closed" state, and dashed lines indicate that any of the "open" state and the "closed" state is preferable.

Figure 6A:
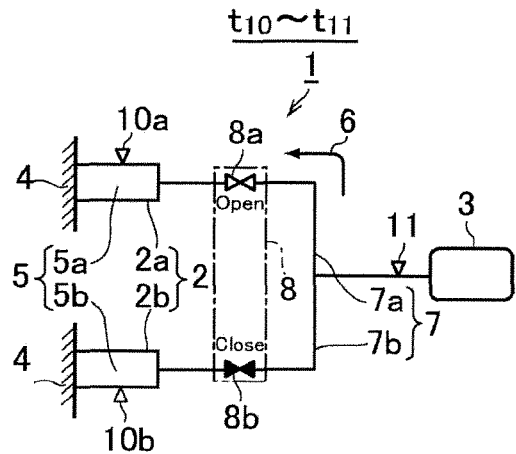
FIGS. 6a, 6b, 6c, 6d, 6e, 6f and 6g are block diagrams showing schematically a flow of a reaction medium and an 'open' state or a 'closed' state of each valve when each valve is controlled such that there is a temperature change shown in FIG. 5.

As a judgment of heating (warming up) the heating portion 4 is established (point of time $t_{10}$), as shown in FIG. 6a, the first valve 8a is opened, and the second valve 8b is maintained to be closed. Consequently, the reaction medium 6 is supplied to the first reactor 2a, and the endothermic reaction occurs in the first reactor 2a, and the heating portion 4 is heated (warmed up) by the heat from the first reactor 2a. In that case, by the heating portion 4 being started to be operational and by the transmission of heat from the first reactor 2a, the temperature $T_B$ of the second reactor 2b rises slightly.

Figure 6B:
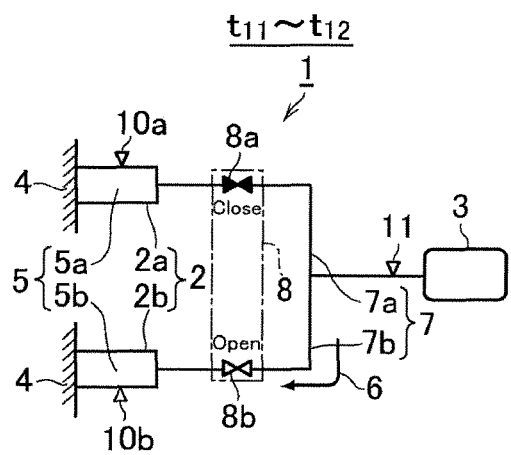

Thus, as the temperature $T_A$ of the first reactor 2a reaches the abovementioned threshold value $\tau_0$ (point of time $t_{11}$), as shown in FIG. 6b, the first valve 8a is closed, and the second valve 8b is opened. Consequently, a situation in which a portion of the reaction medium 6 supplied from the adsorber 3 to the first reactor 2a flows to the second reactor 2b thereby leading to inadequacy of the amount of reaction medium 6 in the first reactor 2a, is prevented or suppressed from occurring, and the heat release in the first reactor 2a is carried out with priority over the second reactor 2b. From the point of time $t_{11}$ onward, the rise in temperature of the first reactor 2a becomes gradual, whereas the exothermic reaction in the second reactor 2b becomes vigorous and the temperature $T_B$ of the second reactor 2b rises with a large gradient.

Figure 6C:
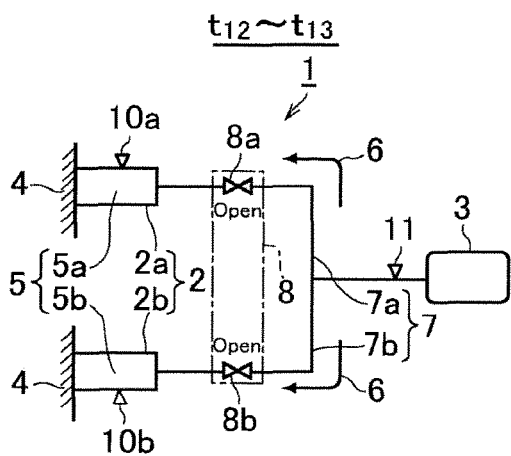

As the temperature $T_B$ of the second reactor 2b reaches the abovementioned threshold value $\tau_0$ (point of time $t_{12}$), as shown in FIG. 6c, both the valves 8a and 8b are opened. In this state, an adequate amount of the reaction medium 6 is supplied to the reactors 2a and 2b and the exothermic reaction is almost completed, and the heating portion 4 is heated sufficiently as needed to be. Therefore, no reaction in particular occurs in the reactors 2a and 2b. Moreover, since the heating portion 4 is operational and the temperature thereof becomes high gradually, the temperature of the reactors 2a and 2b continues to rise.

Figure 6D:
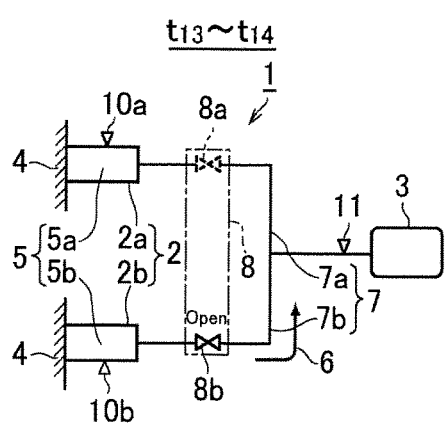

Moreover, as the temperature $T_B$ of the second reactor 2b reaches the desorption start temperature $\tau_1$ (point of time $t_{13}$), desorption of the reaction medium 6 is possible in the second reactor 2b. Therefore, in order to carry out the desorption of the reaction medium 6 (heat accumulation for the second reactor 2b), the second valve 8b is opened as shown in FIG. 6d. Whereas, in the first reactor 2a, the reaction with the reaction medium 6 has been completed, and the temperature has reached the temperature at which the reaction medium 6 is desorbed. Consequently, an inflow and outflow of the reaction medium 6 to and from the first reactor 2a is not restricted in particular, and since it is not demanded, the first valve 8a may be either opened or closed. However, since the first valve 8a is opened immediately before, and is eventually controlled to be opened for allowing the reaction medium 6 to be desorbed by reaching the desorption start temperature $\tau_1$, the first valve 8a may be maintained to be opened so as to avoid unnecessary switchover between "open" state and "closed" state.

Figure 6E:
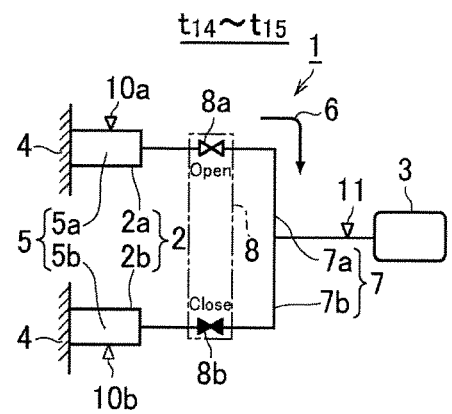

In a state of the reaction medium 6 allowed to be desorbed in the second reactor 2b, as the temperature $T_A$ of the first reactor 2a reaches the desorption start temperature $\tau_1$ (point of time $t_{14}$), the first valve 8a is opened and the second valve 8b is closed as shown in FIG. 6e. In other words, when both the first reactor 2a and the second reactor 2b have assumed a state in which the desorption is possible, the desorption (in other words, heat accumulation) in the first reactor 2a is given priority over the desorption in the second reactor 2b. In the second reactor 2b, a vapor pressure becomes high due to the reaction medium 6 that has desorbed, and the desorption (in other word, heat accumulation) of the reaction medium 6 in the second reactor 2b is suppressed. Moreover, for the first reactor 2a, by the first valve 8a being opened and the second valve 8b being closed, the reaction medium 6 inflows from the second reactor 2b. However, the desorption of the reaction medium 6 in the first reactor 2a is not restricted or suppressed due to the inflow of the reaction medium 6 from the second reactor 2b, and rather the reaction medium 6 desorbed in the first reactor 2a inflows actively into the adsorber 3 and is adsorbed. In other words, the heat accumulation due to the desorption of the reaction medium 6 in the first reactor 2a occurs with priority over the heat accumulation in the second reactor 2b. Since the desorption of the reaction medium 6, or in other words the endothermic reaction in the second reactor 2b, is restricted or suppressed, the temperature rises gradually.

Figure 6F:
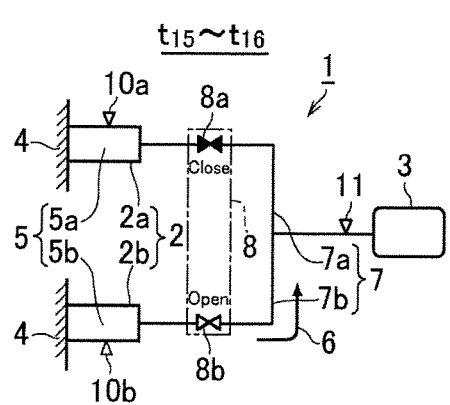

The desorption of the reaction medium 6 advances in the first reactor 2a and is completed eventually (point of time $t_{15}$). In this state, since the heat accumulation by the first reactor 2a carried out on the priority basis has been completed, for restarting the heat accumulation by the second reactor 2b, the second valve 8b is opened as shown in FIG. 6f. In this case, in order to prevent or suppress the reaction medium 6 from flowing into the first reactor 2a from the second reactor 2b, the first valve 8a is closed.

Figure 6G:
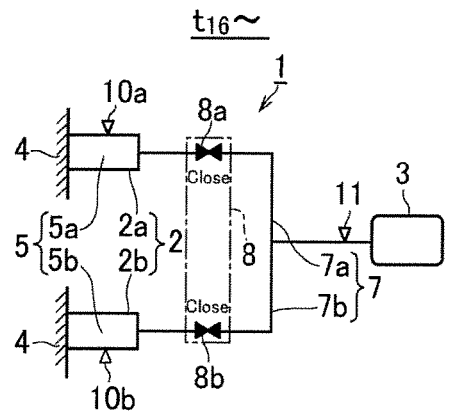

Moreover, when the desorption of the reaction medium 6 in the second reactor 2b (heat accumulation by the second reactor 2b) is completed (point of time $t_{16}$), both the first valve 8a and the second valve 8b are closed as shown in FIG. 6g. This is for maintaining the heat accumulation state by the reactors 2a and 2b. The temperature of the reactors 2a and 2b rises with the rise in temperature of the heating portion 4.

When the manner in which the temperature of the first reactor 2a and the second reactor 2b changes is different from that shown in an example in FIG. 5, a negative judgment is made at step S6 and step S8 in the routine shown in FIG. 3a. For example, if the desorption of the reaction medium 6 in the second reactor 2b completed before the temperature $T_A$ of the first reactor 2a reached the desorption start temperature $\tau_1$, the answer of step S8 will be NO. In that case, the process advances to step S14 in FIG. 3b, and a judgment of whether or not the desorption of the reaction medium 6 in the second reactor 2b is completed in a state of the temperature $T_A$ of the first reactor 2a less than the desorption start temperature $\tau_1$ is made. The judgment of completion of desorption may be made as described above by referring to FIG. 4.

If the answer of step S14 is NO, the routine returns to step S7 shown in FIG. 3a, and the valves 8a and 8b are maintained to be in the previous "open" state and "closed" state. Whereas, if the answer of step S14 is YES, the second valve 8b is controlled to be closed, and the first valve 8a is controlled to be either opened or closed (step S15). The second valve 8b is to be closed in order to prevent or suppress the reaction medium 6 from flowing into the second reactor 2b when the reaction medium 6 is desorbed in the first reactor 2a. Moreover, the first valve 8a is let to be either opened or closed in order to wait for the first reactor 2a to be heated by the heating portion 4 which is already in the operational state, and the temperature of the first reactor 2a reaching the desorption start temperature $\tau 1$.

Thereafter, a judgment of whether or not the temperature $T_A$ of the first reactor 2a has reached the desorption start temperature $\tau_1$ is made (step S16). If the answer of step S16 is NO, the routine returns to step S15, and the control state is maintained to be the previous control state. Whereas, if the answer of step S16 is YES, with the second valve 8b closed as it has been, the first valve 8a is controlled to be opened, and the desorption of the reaction medium 6 in the first reactor 2a is accelerated (step S17). In other words, the heat accumulation by the first reactor 2a is carried out.

A judgment of whether or not the desorption in the first reactor 2a carried out in such manner has completed is made (step S18). If a negative judgement is made at step S18, the process returns to step S17, and the previous control state is maintained. Whereas, if an affirmative judgment is made at step S18, since it signifies that the desorption of the reaction medium 6 in the first reactor 2a and the second reactor 2b is completed, the process advances to step S13 shown in FIG. 3a, and the first valve 8a and the second valve 8b are closed, and the routine shown in FIGS. 3a and 3b is completed for a time.

Figure 7:
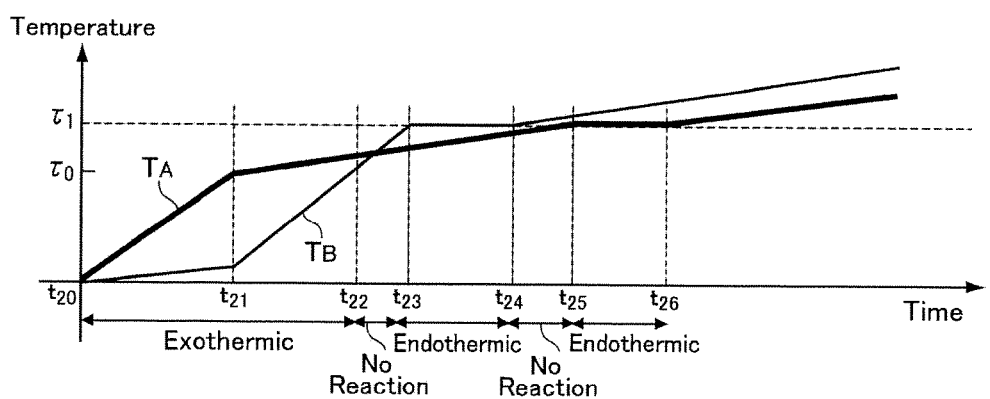
FIG. 7 is a time chart showing another example of the change in temperature of each reactor when the control is carried out by the control system in the embodiment of the present application.
Figure 8A:
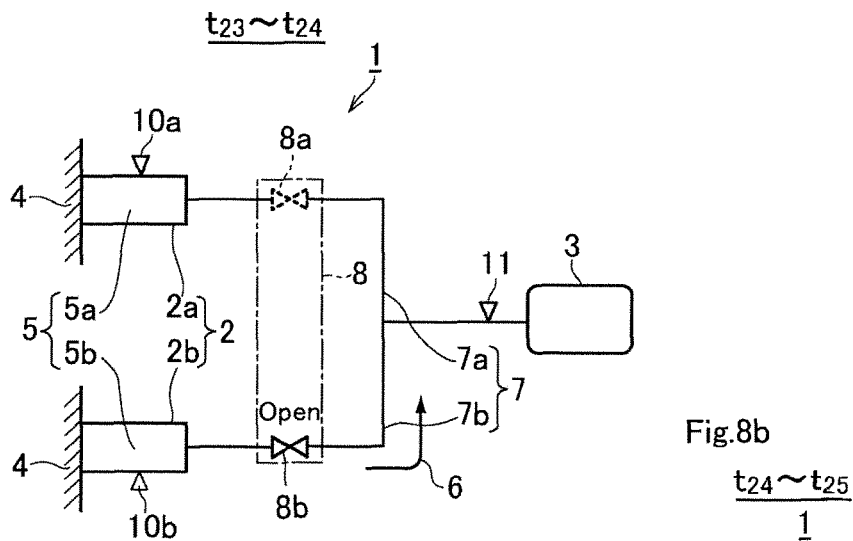
FIGS. 8a, 8b and 8c are block diagrams showing schematically the flow of the reaction medium and an 'open' state or a 'closed' state of each valve in a heat accumulation process when each valve is controlled such that there is a temperature change shown in FIG. 7.
Figure 8B:
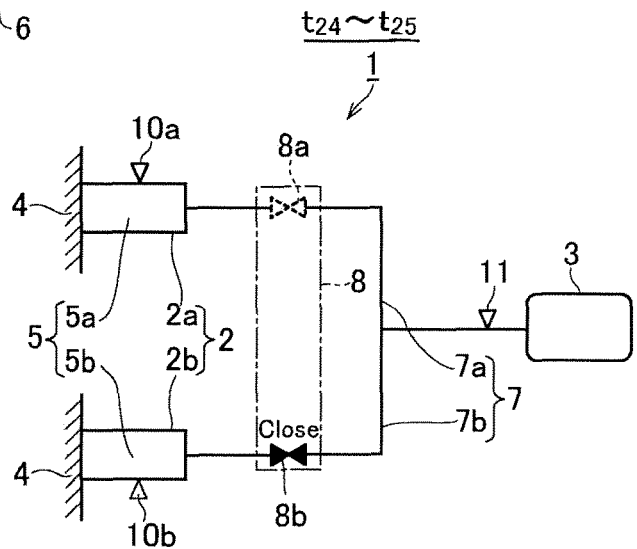
Figure 8C:
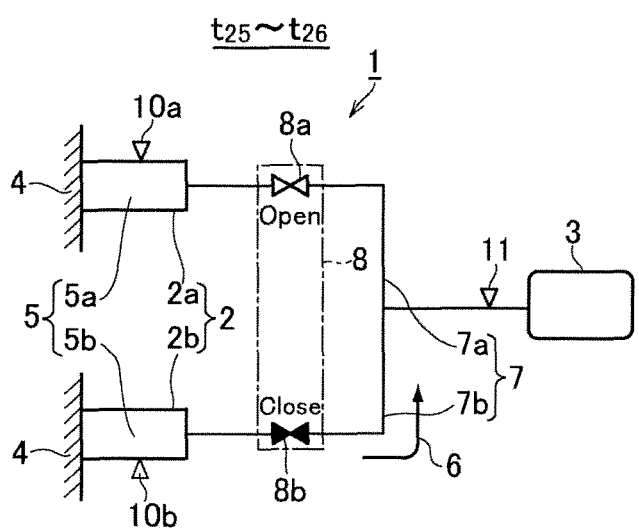

The change in temperatures $T_A$ and $T_B$ of the reactors 2a and 2b when a negative judgment is made at the abovementioned step S8 in FIG. 3a and an affirmative judgment is made at step S14 in FIG. 3b is shown by a time chart in FIG. 7. The "open" state and the "closed" state of each of the valves 8a and 8b and the flow of the reaction medium 6 are as shown schematically in FIGS. 8a, 8b and 8c. A state in which the endothermic reaction occurs is shown in FIGS. 8a, 8b and 8c, and a state in which the exothermic reaction occurs being similar to that in FIGS. 6a, 6b, 6c, 6d, 6e, 6f and 6g, the "open" state and the "closed" state of each of the valves 8a and 8b when the exothermic reaction occurs is omitted in FIGS. 8a, 8b and 8c. The meaning of symbols for each of the valves 8a and 8b is similar to that in the example shown in FIGS. 6a, 6b, 6c, 6d, 6e, 6f and 6g.

By establishing a judgment of heating (warming up) of the heating portion 4, the first valve 8a is opened, and the second valve 8b is maintained to be closed. Next, with the temperature $T_A$ of the first reactor 2a reaching the aforementioned threshold value $\tau_0$ (point of time $t_{21}$), the first valve 8a is closed, and the second valve 8b is opened. Thereafter, as the temperature $T_B$ of the second reactor 2b reaches the aforementioned threshold value $\tau_0$ (point of time $t_{21}$), both the valves 8a and 8b are controlled to be opened. In this state, since the heating portion 4 is operational and the temperature thereof becomes high gradually, the temperature of each of the reactors 2a and 2b continues to rise (from point of time $t_{22}$ to point of time $t_{23}$).

Moreover, as the temperature $T_B$ of the second reactor 2b reaches the desorption start temperature $\tau_1$ (point of time $t_{23}$), the second valve 8b is opened. A change in temperature of each of the reactors 2a and 2b from the point of time $t_{20}$ to the point of time $t_{23}$ shown in FIG. 7 is same as or similar to the change in temperature from the point of time $t_{10}$ to the point of time $t_{13}$ shown in FIG. 7. Whereas, the reaction with the reaction medium 6 has been completed in the first reactor 2a, and the temperature has not reached the temperature at which the reaction medium 6 desorbs. Consequently, the inflow and outflow of the reaction medium to and from the first reactor 2a is not restricted in particular, and since it is not demanded, the first valve 8a may be either opened or closed. That state is shown in FIG. 8a.

The control, the "open" state and the "closed" state of each of the valves 8a and 8b from the point of time $t_{20}$ to the point of time $t_{23}$, and the change in the temperature of each of the reactors 2a and 2b are similar to the abovementioned control shown in the flowchart of FIG. 3a, the state shown in FIGS. 6a, 6b, 6c and 6d, and the change shown in FIG. 5.

Thereafter, the desorption of the reaction medium 6 in the second reactor 2b is completed (point of time $t_{24}$) before the temperature of the first reactor 2a reaches the desorption start temperature $\tau_1$. In such case, an affirmative judgment is made at step S14 shown in FIG. 3b, and the second valve 8b is closed. This is for preventing or suppressing the reaction medium 6 from flowing into the second reactor 2b from first reactor 2a, and maintaining the heat accumulation state by the second reactor 2b. The first valve 8a may be closed or may be open. This is because the exothermic reaction in the first reaction has been completed, and no desorption of the reaction medium 6 occurs. This state is shown schematically in FIG. 8b.

As the desorption of the reaction medium 6 in the second reactor 2b is completed, the temperature $T_B$ of the second reactor 2b rises gradually due to the heating portion 4. As the temperature $T_A$ of the first reactor 2a reaches the desorption start temperature $\tau_1$ (point of time $t_{25}$) while the temperature $T_B$ of the second reactor 2b rises gradually, since the desorption of the reaction medium 6 in the first reactor 2a occurs and the heat accumulation is accelerated due to the reaction medium 6 getting desorbed, the first valve 8a is controlled to be 'open' as shown in FIG. 8c. The second valve 8b is controlled to be closed for maintaining the heat accumulation state by the second reactor 2b.

As the desorption of the reaction medium 6 in the first reactor 2a advances and is completed eventually (point of time $t_{26}$), the first valve 8a is closed in order to maintain the heat accumulation state by the first reactor 2a. This state is a state shown in the aforementioned FIG. 6g. The temperature of the reactors 2a and 2b rise with the rise in the temperature of the heating portion 4.

In the two examples mentioned above, the temperature $T_B$ of the second reactor 2b reaches the desorption start temperature $\tau_1$ before the temperature $T_A$ of the first reactor 2a reaches. Conversely, sometimes the temperature $T_A$ of the first reactor 2a reaches the desorption start temperature $\tau_1$ before the temperature $T_B$ of the second reactor 2b reaches. An example of such case is described below. As the temperature $T_A$ of the first reactor 2a reaches the desorption start temperature $\tau_1$ before the temperature $T_B$ of the second reactor 2b reaches, the answer of step S6 in the routine shown in FIG. 3a will be NO. In that case, the routine advances to step S19 shown in FIG. 3c, and a judgment of whether or not the temperature $T_A$ of the first reactor 2a is higher than or equal to the desorption start temperature $\tau_1$ and whether or not the temperature $T_B$ of the second reactor 2b is less than the desorption start temperature $\tau_1$ is made.

If the answer of step S19 is NO, the process returns to step S5 shown in FIG. 3a. Moreover, if the answer of step S19 YES, the first valve 8a is opened (step S20). This is for allowing the first reactor 2a to communicate with the adsorber 3 and expediting the desorption of the reaction medium 6 in the first reactor 2a. In that case, the second valve 8b may be controlled to be either opened or closed. This is because, although the exothermic reaction in the second reactor 2b is already completed, no desorption of the reaction medium 6 occurs in the second reactor 2b, and furthermore, there is no problem in particular even if the reaction medium 6 inflows from the first reactor 2a.

A judgment of whether or not the temperature $T_B$ of the second reactor 2b in a state of the desorption of the reaction medium 6 made to occur in the first reactor 2a has become higher than or equal to the desorption start temperature $\tau_1$ is made (step S21). If the answer of step S21 is YES, since the desorption of the reaction medium 6 is possible in both the first reactor 2a and the second reactor 2b, and for giving priority to the desorption of the reaction medium 6 in the first reactor 2a, the process advances to step S9 shown in FIG. 3a, and the first valve 8a is controlled to be opened and the second valve 8b is controlled to be closed. The control from step S10 to step S13 is carried out in order. If a negative judgment is made at step S21, a judgment of whether or not the desorption of the reaction medium 6 in the first reactor 2a has completed is made. If the answer of step S22 is NO, the routine returns to step S20, and the control state immediately before is maintained.

Figure 9:
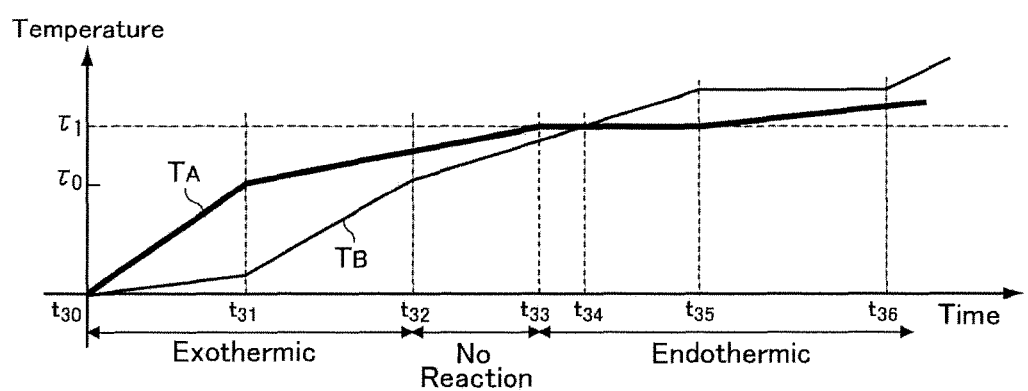
FIG. 9 is a time chart showing still another example of the change in temperature of each reactor when the control is carried out by the control system in the embodiment of the present application.
Figure 10A:
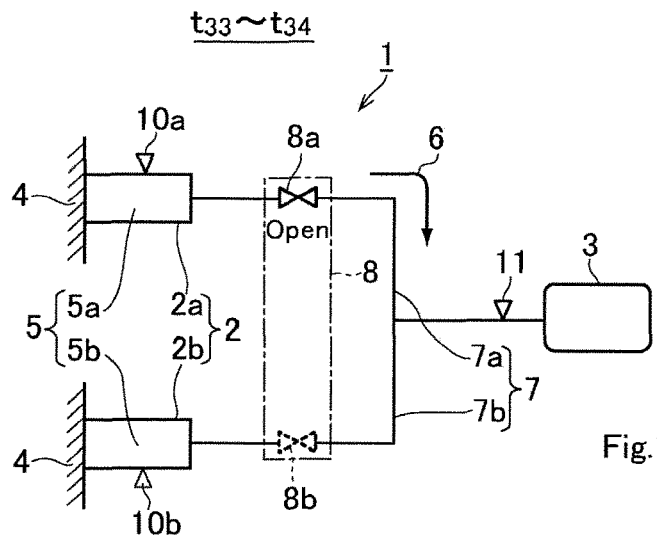
FIGS. 10a, 10b and 10c are block diagrams showing schematically the flow of the reaction medium and an 'open' state or a 'close' state of each valve in a heat accumulation process when each valve is controlled such that there is a temperature change shown in FIG. 9.
Figure 10B:
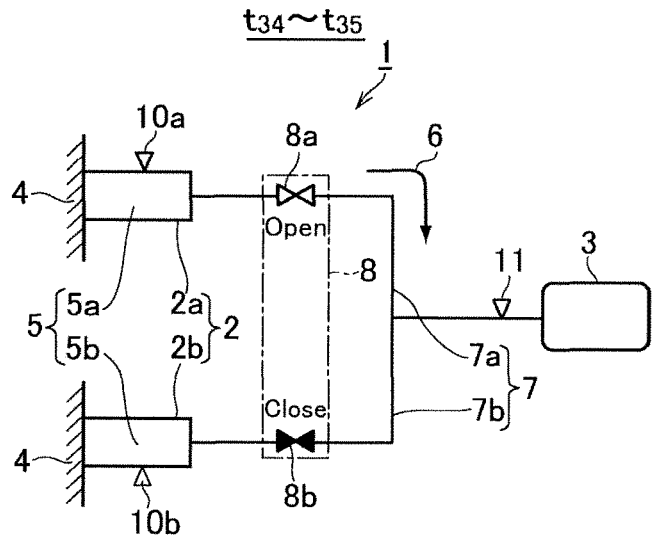
Figure 10C:
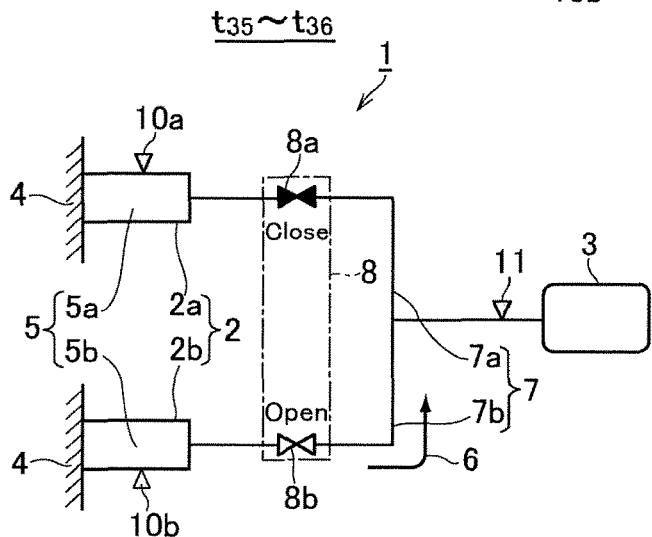

An example of a change in the temperature of each of the reactors 2a and 2b when the control at step S19 to step S21 and at step S9 to step S12 is carried out is shown in a time chart in FIG. 9. Moreover, the "open" state and the "closed" state of each of the valves 8a and 8b and the flow of the reaction medium 6 in each of the valves 8a and 8b is shown schematically in FIGS. 10a, 10b and 10c. A state in which the endothermic reaction occurs is shown in FIGS. 10a, 10b and 10c, and since in the state in which the exothermic reaction occurs, the situation being similar as in FIGS. 6a, 6b, 6c, 6d, 6e, 6f and 6g, the "open" state and the "closed" state of each of the valves 8a and 8b when the exothermic reaction occurs is omitted in FIGS. 10a, 10b and 10c. The meaning of symbols for each of the valves 8a and 8b is similar to that in the example shown in FIGS. 6a, 6b, 6c, 6d, 6e, 6f and 6g.

By establishing a judgment of heating (warming up) of the heating portion 4, the first valve 8a is opened, and the second valve 8b is maintained to be closed or with a narrow opening, and with this, the temperature $T_A$ of the first reactor 2a becomes high gradually, and moreover the temperature $T_B$ of the second reactor 2b rises with a gradient smaller than that of the temperature $T_A$ of the first reactor 2a (point of time $t_{30}$ to point of time $t_{31}$). Such temperature change is similar as in the examples shown in FIG. 5 and FIG. 7. The temperature $T_A$ of the first reactor 2a reaches the aforementioned threshold value $\tau_0$ (point of time $t_{31}$), and the first valve 8a is closed and the second valve 8b is opened.

Next, as the temperature $T_B$ of the second reactor 2b reaches the aforementioned threshold value $\tau_0$ (point of time $t_{32}$), both the valves 8a and 8b are controlled to be opened. In this state, since the heating portion 4 is operational and the temperature thereof becomes high gradually, the temperature of each of the reactors 2a and 2b continues to rise, but in the example shown in FIG. 9, the gradient of rise in the temperature $T_B$ of the second reactor 2b drops (point of time $t_{32}$ to point of time $t_{33}$). A change in temperature of each of the reactors 2a and 2b from the point of time $t_{31}$ to the point of time $t_{32}$ shown in FIG. 9 is same as or similar to the change in temperature form the point of time $t_{11}$ to the point of time $t_{12}$ shown in FIG. 5.

In the example shown in FIG. 9, by the rise in the temperature $T_B$ of the second reactor 2b becoming slow, the temperature $T_A$ of the first reactor 2a reaches the desorption start temperature $\tau_1$ (point of time $t_{33}$) before the temperature $T_B$ of the second reactor 2b reaches the desorption start temperature $\tau_1$. In this state, since the first valve 8a is controlled to be opened and the desorption of the reaction medium 6 occurs in the first reactor 2a, the temperature $T_A$ of the first reactor 2a is maintained to be a constant temperature of a level of the desorption start temperature $\tau_1$ by the endothermic reaction between the reaction material 5 and the reaction medium 6. Whereas, the temperature $T_B$ of the second reactor 2b rises toward the desorption start temperature $\tau_1$ (point of time $t_{33}$ to point of time $t_{34}$) due to the heat transmitted from the heating portion 4. The "open" state and the "closed" state of each of the valves 8a and 8b in this case is as shown in FIG. 10a, and the second valve 8b may be either opened or closed.

As the temperature $T_B$ of the second reactor 2b reaches the desorption start temperature $\tau_1$ (point of time $t_{34}$) in a state of the desorption in the first reactor 2a advanced, both the first reactor 2a and the second reactor 2b assume a state in which the desorption is possible. Consequently, as shown in FIG. 10b, the second valve 8b is closed for giving priority to the desorption in the first reactor 2a over the desorption in the second reactor 2b. In other words, a situation in which the reaction medium 6 desorbed in the second reactor 2b flows in to the first reactor 2a, or the pressure of the adsorber 3 is raised, is prevented or suppressed from occurring, and the desorption of the reaction medium 6 in the first reactor 2a and the heat accumulation accompanied thereby occur on the priority over the second reactor 2b. Since the second valve 8b is closed and the desorption (endothermic reaction) of the reaction medium 6 is restricted in the second reactor 2b, the temperature $T_B$ of the second reactor 2b becomes high gradually to be higher than or equal to the desorption start temperature $\tau_1$ due to the heat transmitted from the heating portion 4 (point of time $t_{34}$ to point of time $t_{35}$).

As the desorption in the first reactor 2a advances and the desorption of the reaction medium 6 in the first reactor 2a is completed (point of time $t_{35}$), as shown in FIG. 10c, the first valve 8a is closed and the heat accumulation by the first reactor 2a is completed, and the temperature $T_A$ thereof rises gradually due to the heat from the heating portion 4. Moreover, the second valve 8b is controlled to be opened and the desorption of the reaction medium 6 (endothermic reaction) in the second reactor 2b is started, and the temperature of the second reactor 2b is maintained at a predetermined temperature depending on the heat accumulation due to the desorption of the reaction medium 6 and the heat input from the heating portion 4 (point of time $t_{35}$ to point of time $t_{36}$). Moreover, as the desorption of the reaction medium 6 in the second reactor 2b is completed (point of time $t_{36}$), both the first valve 8a and the second valve 8b are controlled to be closed. Consequently, the temperature $T_B$ of the second reactor 2b rises gradually. The change in each of the temperatures $T_A$ and $T_B$ from the point of time $t_{34}$ onward and the "open" state and the "closed" state of each of the valves 8a and 8b are similar to those shown FIG. 5 and FIGS. 6a, 6b, 6c, 6d, 6e, 6f and 6g.

Next, an example of control when the temperature $T_B$ of the second reactor 2b reaches the desorption start temperature $\tau_1$ after the desorption of the reaction medium 6 in the first reactor 2a is completed will be described below. In such case, since the desorption of the reaction medium 6 in the first reactor 2a is completed in a state of the temperature $T_B$ of the second reactor 2b less than the desorption start temperature $\tau_1$, a negative judgment is made at step S21 and an affirmative judgment is made at step S22 shown in FIG. 3c. In this case, the first valve 8a is closed for maintaining the heat accumulation state by the first reactor 2a (step S23), and the communication between the first reactor 2a and the adsorber 3 is cut off. By the temperature $T_B$ of the second reactor 2b being less than the desorption start temperature $\tau_1$, the second valve 8b may be either opened or closed.

Next, a judgment of whether or not the temperature $T_B$ of the second reactor 2b is higher than or equal to the desorption start temperature $\tau_1$, or in other words, whether or not the temperature $T_B$ of the second reactor 2b has reached the desorption start temperature $\tau_1$ is made (step S24). If the answer of step S24 is NO, the process returns to step S23, and the previous control state is maintained. Whereas, if the answer of step S24 is YES, the second valve 8b is controlled to be opened in order to accelerate the desorption of the reaction medium 6 (heat accumulation) in the second reactor 2b, and the first valve 8a is maintained to be closed. This is a control at step S11 shown in FIG. 3a, and consequently, from here (step S11) onward, the control at step S12 and S13 shown in FIG. 3a is carried out in order, and the routine shown in FIGS. 3a, 3b and 3c is completed for a time.

Figure 11:
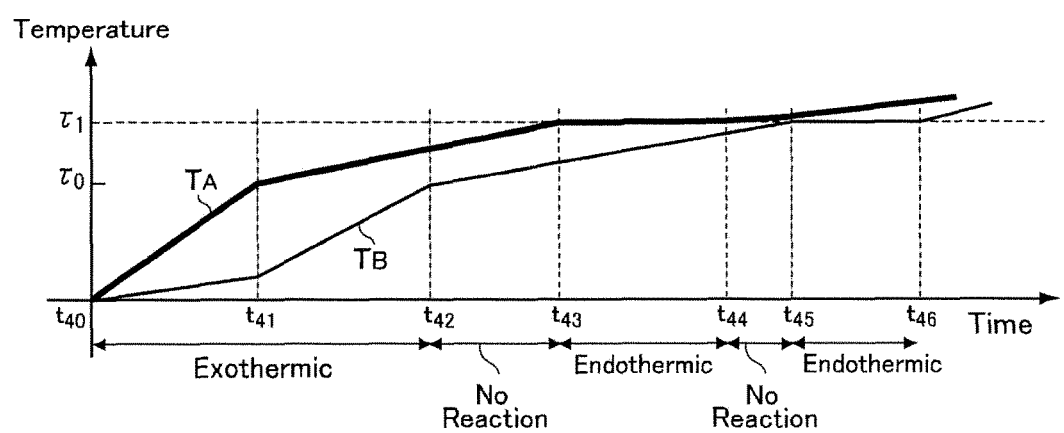
FIG. 11 is a time chart showing still another example of the change in temperature of each reactor when the control is carried out by the control system in the embodiment of the present application.
Figure 12A:
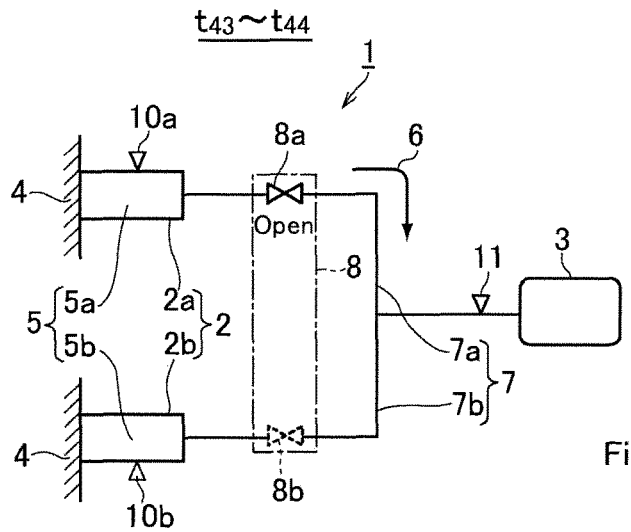
FIGS. 12a, 12b and 12c are block diagrams showing schematically the flow of the reaction medium and an 'open' state or a 'closed' state of each valve in the heat accumulation process when each valve is controlled such that there is a temperature change shown in FIG. 11.
Figure 12B:
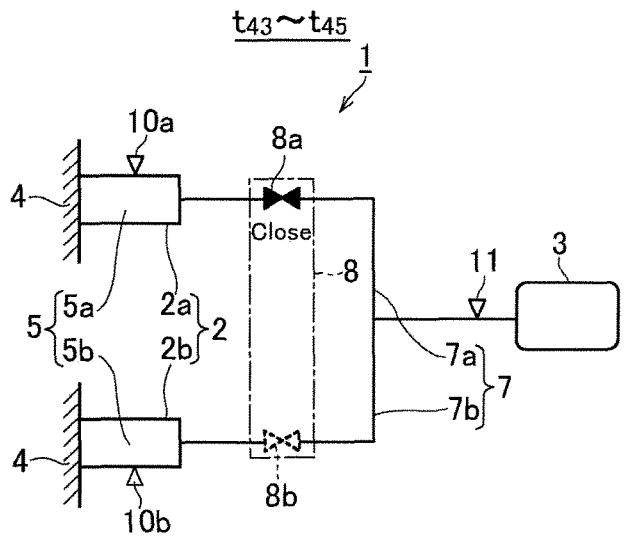
Figure 12C:
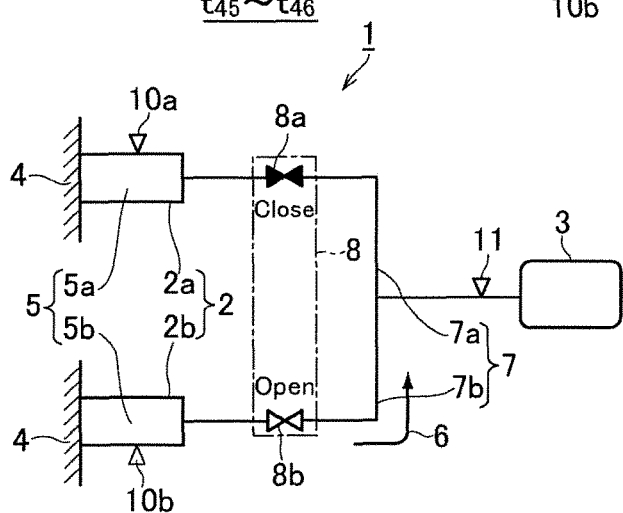

An example of a change in temperature of each of the reactors 2a and 2b when the control at step S23 to step S24 is carried out is shown in a time chart in FIG. 11. Moreover, the "open" and "close" state of each of the valves 8a and 8b and the flow of the reaction medium 6 are shown schematically in FIGS. 12a, 12b and 12c. A state in which the endothermic reaction occurs is shown in FIGS. 12a, 12b and 12c and a state in which the exothermic reaction occurs being similar to that in the FIGS. 6a, 6b, 6c, 6d, 6e, 6f and 6g, the "open" state and the "closed" state of each of the valves 8a and 8b when the exothermic reaction occurs are omitted in FIGS. 12a, 12b and 12c. Moreover, the meaning of symbols for each of the valves 8a and 8b is similar to that in the example shown in FIGS. 6a, 6b, 6c, 6d, 6e, 6f and 6g.

In FIG. 11, after a judgment of heating (warming up) of the heating portion 4 is established (point of time $t_{40}$), the temperature $T_A$ of the first reactor 2a reaches the threshold value $\tau_0$ (point of time $t_{41}$), moreover the temperature $T_B$ of the second reactor 2b reaches the threshold value $\tau_0$ (point of time $t_{42}$), and furthermore, the temperature $T_A$ of the first reactor 2a reaches the desorption start temperature $\tau_1$ (point of time $t_{43}$). The change in temperature, and the "open" state and the "closed" state of each of the valves 8a and 8b from the point of time $t_{40}$ to the point of time $t_{43}$ are similar to the change in temperature and the state from the point of time $t_{31}$ to the point of time $t_{33}$ shown in FIG. 9.

At the point of time $t_{43}$ shown in FIG. 11, since temperature $T_A$ of the first reactor 2a reaches the desorption start temperature $\tau_1$, and the temperature $T_B$ of the second reactor 2b is less than the desorption start temperature $\tau_1$, the first valve 8a is controlled to be opened as shown in FIG. 12a. The second valve may be either opened or closed. Consequently, desorption of the reaction medium 6 (heat accumulation) in the first reactor 2a is allowed to advance.

In that state, as the desorption of the reaction medium 6 in the first reactor 2a is completed (point of time $t_{44}$) without the temperature $T_B$ of the second reactor 2b having reached the desorption start temperature $\tau_1$ as it has been, the first valve 8a is closed so as to prevent or suppress the reaction medium 6 flowing in from the first reactor 2a and to maintain the heat accumulation state by the first reactor 2a. Since the temperature $T_B$ of the second reactor 2b has not still reached the desorption start temperature $\tau_1$, the second valve 8b may be either opened or closed. This state is shown in FIG. 12b.

Thereafter, as the temperature $T_B$ of the second reactor 2b reaches the desorption start temperature $\tau_1$ (point of time $t_{45}$), the second valve 8b is opened in the state of the first valve 8a closed as shown in FIG. 12c. Consequently, the desorption reaction (endothermic reaction) of the reaction medium 6 starts in the second reactor 2b, and the temperature $T_B$ of the second reactor 2b is maintained at the level of the desorption start temperature $\tau_1$ (point of time $t_{45}$ to point of time $t_{46}$). Moreover, as the desorption of the reaction medium 6 is completed in the second reactor 2b (point of time $t_{46}$), both the first valve 8a and the second valve 8b are controlled to be closed. Consequently, the temperature $T_B$ of the second reactor 2b rises gradually.

As described above specifically, in the control system according to the embodiment of the present application, since the plurality of reactors 2a and 2b or reaction materials 5a and 5b are connected to one adsorber 3 in common, the number of adsorbers is lesser than the number of the heating portions, and the reactors 2a and 2b or the reaction materials 5a and 5b. As a result, it is possible to simplify the overall arrangement of the chemical heat accumulator 1 and to make it small-sized. Moreover, by selecting the reactors 2a and 2b for which the heat release or the heat accumulation is required to be carried out on priority basis, and by allowing those reactors 2a and 2b to communicate with the adsorber 3 with priority over the other reactors 2a and 2b, it is possible to allow the exothermic reaction and the endothermic reaction to occur. In other words, even if the plurality of reactors 2a and 2b is connected to one adsorber 3, it is possible to carry out the heat release and heat accumulation according to the degree of priority.

In the control system according to the present application, when at least two of the plurality of reactors are capable of carrying out the exothermic reaction, the exothermic reaction can be caused to occur in the reactor having a high degree of priority out of those reactors, with priority over the other reactors. In all the examples shown in FIG. 5, FIG. 7, FIG. 9, and FIG. 11, the first reactor 2a corresponds to the reactor having a high degree of priority, and the reaction medium 6 is supplied to the first reactor 2a on priority basis. Moreover, in the control system according to the present application, when at least two of the plurality of reactors are capable of carrying out the endothermic reaction, the endothermic reaction can be caused to occur in the reactor having a high degree of priority out of these reactors, with priority over the other reactors. Consequently, for such heat accumulation control, an ability to desorb the reaction medium in at least two reactors becomes a premise which is established (satisfied) in the examples shown in FIG. 5 and FIG. 9. The first reactor 2a corresponds to the reactor having a high degree of priority, and the reaction medium 6 is allowed to be desorbed from the first reactor 2a on the priority basis.

In the control system according to the present application, when the valve is opened, the opening is not restricted to be 100%, and may be larger than the opening when the valve is closed, within a range of achieving the object of control. Similarly, when the valve is closed, the opening is not restricted to be 0%, and may be smaller than the opening when the valve is opened. Furthermore, while controlling the valve to be opened or closed, the opening may not be changed uniformly, and may be changed gradually step-by-step.

Moreover, in the chemical heat accumulator according to the present application, three or more reactors may be connected to a single adsorber, and in this case, the reactors may be divided into two groups, with one group having a high degree of priority and the other group having a low degree of priority, and the control may be carried out for these groups similarly as in the aforementioned illustrative embodiment. In that case, one group may include a single reactor and the other group may include a plurality of reactors. Moreover, the plurality of reactors in each group may be further divided into a reactor having a high degree of priority and a reactor having a low degree of priority, and the control may be carried out for these reactors similarly as in the aforementioned illustrative embodiment. Reaction materials to be used in these reactors may be a same substance or may be different substances.

In the abovementioned illustrative embodiment, a case in which the temperatures $T_A$ and $T_B$ of the reactors 2a and 2b respectively reach the desorption start temperature $\tau_1$ simultaneously, has not been described. The control system according to the present application may be let to carry out control such that the heat release or heat accumulation occurs on priority basis in the reactors 2a and 2b having a high degree of priority. Consequently, in the embodiment of the present application, when the temperatures $T_A$ and $T_B$ of the reactors 2a and 2b respectively reach the desorption start temperature $\tau_1$ simultaneously, the control may be carried out such that one of the reactors having a high degree of priority is allowed to communicate with the adsorber, and the other reactor is cut-off from the adsorber.

Moreover, FIGS. 3a, 3b and 3c are flow charts which can be used in any of the cases in which the temperature of each of the reactors 2a and 2b changes as shown in FIG. 5, FIG. 7, FIG. 9, and FIG. 11. However, the control carried out by the control system of the present application is not restricted to the examples of control shown in FIGS. 3a, 3b and 3c, and in cases such as a case in which the change in temperature of the reactor is known in advance, the control system may carry out the control shown in any of FIGS. 3a, 3b and 3c. Moreover, an order of judgment at step S6 and step S9, or at step S8 and step S14 is not restricted to the order shown in the abovementioned illustrative embodiment, and may be determined appropriately.

What is claimed is:

1. A control system for a chemical heat accumulator, which releases heat by an exothermic reaction between a reaction material and a reaction medium, and accumulates heat by the reaction medium being desorbed from the reaction material and by maintaining the state of the reaction medium desorbed from the reaction material, wherein the chemical heat accumulator includes at least two reactors, each containing the reaction material, which carry out heat exchange with an object to be heated, a reservoir which is connected to the reactors and stores the reaction medium, and a valve mechanism which makes the reactors communicate separately with the reservoir, and cuts off the reactors from the reservoir, comprising:

a controller which controls an opening of the valve mechanism;

wherein the controller is configured to:

control the opening of the valve mechanism such that a flow rate of the reaction medium circulated from the reservoir to a first reactor for which heat release or heat accumulation is to be completed earlier than a second reactor, becomes higher than a flow rate of the reaction medium circulated from the reservoir to the second reactor, when at least the first reactor and the second reactor are in a state in which the exothermic reaction between the reaction material and the reaction medium is possible, and control the opening of the valve mechanism such that a flow rate of the reaction medium circulated from the first reactor to the reservoir, becomes higher than a flow rate of the reaction medium circulated from the second reactor to the reservoir, when at least the first reactor and the second reactor are in a state in which an endothermic reaction in which the reaction medium is desorbed from the reaction material is possible.

2. The control system for the chemical heat accumulator as claimed in claim 1, wherein the chemical heat accumulator has a first pipe conduit which connects the first reactor and the reservoir, and a second pipe conduit which connects the second reactor and the reservoir, and the valve mechanism is capable of opening and closing the first pipe conduit and the second pipe conduit separately, and the controller is further configured to control the valve mechanism such that the first pipe conduit is opened and the second pipe conduit is closed, when at least the first reactor and the second reactor are in a state in which the exothermic reaction between the reaction material and the reaction medium is possible.

3. The control system for the chemical heat accumulator as claimed in claim 2, wherein the controller is further configured to control the valve mechanism such that the second pipe conduit is closed after an amount of the reaction medium supplied to the first reactor reaches a predetermined amount.

4. The control system for the chemical heat accumulator as claimed in claim 1, wherein the state of the first reactor and the second reactor are in a state in which the endothermic reaction is possible includes a state in which, a temperature of both reactors has reached a judgment reference temperature at which the reaction medium is desorbed from the reaction material, and the controller is further configured to control the opening of the valve mechanism such that the flow rate of the reaction medium between the first reactor and the reservoir becomes higher than the flow rate of the reaction medium between the second reactor and the reservoir, when the first reactor and the second reactor are in the state in which the endothermic reaction, is possible due to the temperature of the second reactor reaching the judgment reference temperature after the temperature of the first reactor has reached the judgment reference temperature, or when the first reactor and the second reactor are in the state in which the endothermic reaction, is possible due to the temperature of the first reactor reaching the judgment reference temperature after the temperature of the second reactor has reached the judgment reference temperature.

5. The control system for the chemical heat accumulator as claimed in claim 4, wherein the controller is further configured to control the opening of the valve mechanism such that the flow rate of the reaction medium between the second reactor and the reservoir becomes higher than the flow rate of the reaction medium between the first reactor and the reservoir, after the completion of desorption of the reaction medium from the reaction material in the first reactor.

6. The control system for the chemical heat accumulator as claimed in claim 2, wherein the state of the first reactor and the second reactor are in a state in which the endothermic reaction is possible includes a state in which, a temperature of both reactors has reached a judgment reference temperature at which the reaction medium is desorbed from the reaction material, and the controller is further configured to control the opening of the valve mechanism such that the flow rate of the reaction medium between the first reactor and the reservoir becomes higher than the flow rate of the reaction medium between the second reactor and the reservoir, when the first reactor and the second reactor are in the state in which the endothermic reaction, is possible due to the temperature of the second reactor reaching the judgment reference temperature after the temperature of the first reactor has reached the judgment reference temperature, or when the first reactor and the second reactor are in the state in which the endothermic reaction, is possible due to the temperature of the first reactor reaching the judgment reference temperature after the temperature of the second reactor has reached the judgment reference temperature.

7. The control system for the chemical heat accumulator as claimed in claim 6, wherein the controller is further configured to control the opening of the valve mechanism such that the flow rate of the reaction medium between the second reactor and the reservoir becomes higher than the flow rate of the reaction medium between the first reactor and the reservoir, after the completion of desorption of the reaction medium from the reaction material in the first reactor.

8. The control system for the chemical heat accumulator as claimed in claim 3, wherein the state of the first reactor and the second reactor are in a state in which the endothermic reaction is possible includes a state in which, a temperature of both reactors has reached a judgment reference temperature at which the reaction medium is desorbed from the reaction material, and the controller is further configured to control the opening of the valve mechanism such that the flow rate of the reaction medium between the first reactor and the reservoir becomes higher than the flow rate of the reaction medium between the second reactor and the reservoir, when the first reactor and the second reactor are in the state in which the endothermic reaction, is possible due to the temperature of the second reactor reaching the judgment reference temperature after the temperature of the first reactor has reached the judgment reference temperature, or when the first reactor and the second reactor are in the state in which the endothermic reaction, is possible due to the temperature of the first reactor reaching the judgment reference temperature after the temperature of the second reactor has reached the judgment reference temperature.

9. The control system for the chemical heat accumulator as claimed in claim 8, wherein the controller is further configured to control the opening of the valve mechanism such that the flow rate of the reaction medium between the second reactor and the reservoir becomes higher than the flow rate of the reaction medium between the first reactor and the reservoir, after the completion of desorption of the reaction medium from the reaction material in the first reactor.

\* \* \* \* \*